(12) United States Patent
Kidd et al.

(10) Patent No.: US 6,561,689 B1
(45) Date of Patent: May 13, 2003

(54) TRAPPED LED CHMSL WITH LIVING HINGE

(75) Inventors: R. Andrew Kidd, Alexandria, IN (US); Clayton E. Smith, Muncie, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/043,072

(22) Filed: Jan. 9, 2002

(51) Int. Cl.$^7$ .............................. B60Q 1/30; F21V 17/04
(52) U.S. Cl. ...................... 362/541; 362/240; 362/245; 362/545; 362/800
(58) Field of Search .................. 362/240, 241, 362/245, 247, 248, 249, 541, 544, 545, 800, 235

(56) References Cited

U.S. PATENT DOCUMENTS

| | | | |
|---|---|---|---|
| 4,891,625 A | 1/1990 | VanRiper et al. ............. 340/479 |
| 4,893,220 A | 1/1990 | Kakidaira .................... 362/503 |
| 4,916,592 A | 4/1990 | Sultan et al. ................ 362/496 |
| 4,916,593 A | 4/1990 | Moss et al. ................... 362/503 |
| 4,953,065 A * | 8/1990 | Kao ........................... 362/541 |
| 5,161,882 A * | 11/1992 | Garrett ........................ 362/249 |
| 5,201,579 A | 4/1993 | Roof et al. ................... 362/368 |
| 5,347,435 A | 9/1994 | Smith et al. ................. 362/503 |
| 5,365,411 A | 11/1994 | Rycroft et al. ................ 362/20 |
| 5,471,371 A * | 11/1995 | Koppolu et al. ............. 362/555 |
| 5,488,493 A | 1/1996 | Moss ........................... 359/13 |
| 5,490,049 A | 2/1996 | Montalan et al. ............ 362/240 |
| 5,580,153 A | 12/1996 | Motz .......................... 362/496 |
| 5,632,551 A | 5/1997 | Roney et al. ................ 362/249 |
| 5,704,708 A * | 1/1998 | Barson et al. ............... 362/240 |
| 5,762,414 A | 6/1998 | Montalan et al. ........... 362/503 |
| 5,765,940 A | 6/1998 | Levy et al. ................... 362/240 |
| 5,774,241 A | 6/1998 | Smith ........................... 359/15 |
| 5,882,105 A * | 3/1999 | Barlow ........................ 362/241 |
| 5,954,423 A * | 9/1999 | Logan et al. ................ 362/240 |
| 6,015,223 A | 1/2000 | Kidd et al. .................. 362/503 |
| 6,045,240 A | 4/2000 | Hochstein .................... 362/294 |
| 6,076,950 A | 6/2000 | Topping et al. ............. 362/545 |
| 6,193,392 B1 * | 2/2001 | Lodhie ........................ 362/235 |
| 6,241,372 B1 | 6/2001 | Bloomfield et al. ........ 362/544 |
| 6,241,373 B1 * | 6/2001 | Kelley et al. ................ 362/545 |

\* cited by examiner

*Primary Examiner*—Alan Cariaso
(74) *Attorney, Agent, or Firm*—Ice Miller; Brian T. Ster; Jay G. Taylor

(57) ABSTRACT

An automotive center high mount stop lamp ("CHMSL") comprising a housing, a LED array circuit board having at least one LED, a lens/reflector, and a cover. The housing comprises a base and a trapping panel which are joined by a living hinge which allows the trapping panel to be folded over the base. In the folded position the trapping panel serves to secure the LED array circuit board in position without the need for additional means to retain the LED array circuit board. The lens/reflector and cover, respectively, are then fixably attached to the housing.

28 Claims, 3 Drawing Sheets

TRAPPED LED CHMSL WITH LIVING HINGE

BACKGROUND OF THE INVENTION

The present invention relates generally to automotive lighting. More specifically, the present invention relates to an assembly for an automotive center high mount stop lamp ("CHMSL").

Automotive stop or brake lighting is an important safety feature of vehicles. Such lighting on a vehicle provides notice and warning to surrounding vehicles, especially to drivers located behind the particular vehicle, that the vehicle is slowing or coming to a stop. In fact, the functionality of vehicular stop lamps is so important that such lighting must meet strict government requirements regarding the placement, brightness, and photometrics for such lamps.

For a long period of time, automobiles were generally equipped with only two (2) stop lamps. Usually, such lamps were located on or near the left and right rear corners of a vehicle. More recently, the use of CHMSLs, stop lamps located in the center of the rear of a vehicle and at a height generally higher than the corner-located stop lamps, has also become required and regulated by government agencies.

A variety of CHMSL assemblies are known in the art. Some CHMSL assemblies utilize conventional light bulbs and reflectors to achieve the required brightness and photometrics. More recently, the use of an array of light emitting diodes ("LEDs") in CHMSL assemblies has also become known. LEDs provide the advantages of reduced size and increased functional longevity. Such advantages are extremely important in the design of automobile lighting. Generally, in such a LED CHMSL assembly, an array of LEDs is mounted to an electrical circuit board and the circuit board is attached to a housing of the assembly. Several methods are known in the art for mounting the LED circuit board to a housing. For example, mechanical attachment means such as screws can be used to mount the circuit board to a housing. However, the use of mechanical attachment means increases the number of parts in the CHMSL assembly, which in turn results in higher costs to manufacture the assembly. Additionally, the use of sonic stake welding to mount the LED circuit board to a housing is also known. However, sonic stake welding requires an additional assembly operation that can be time consuming and expensive. Additionally, both mechanical means and sonic stake welding have the disadvantage of allowing the circuit board to become loose after use of the vehicle through vibrations during vehicle travel. Finally, current mounting methods can result in assemblies in which the circuitry of the LED arrays are visible even after the part has been fully assembled. Such a result is not aesthetically pleasing or desired.

Thus, a need exists for a LED CHMSL assembly that may be manufactured and assembled in a manner that securely attaches a LED circuit board within such assembly without the need of, additional parts or additional assembly operations, and that effectively conceals the electrical circuitry of the LED array.

BRIEF SUMMARY OF THE INVENTION

The present invention presents a solution to the above problems by providing CHMSL assemblies which do not require additional parts or additional assembly operations. More specifically, the present invention provides for a CHMSL assembly utilizing a trapping panel to secure a LED array circuit board in place within the assembly. This trapping panel also serves to conceal the electrical circuitry of the LED array circuit board.

The CHMSL assembly of the present invention comprises a housing, a LED array circuit board, a lens/reflector, and a cover. The housing comprises a base and trapping panel foldably connected to each other by a living hinge. The housing is configured such that when the LED array circuit board is placed upon the base, the living hinge allows the trapping panel to be folded over the LED array circuit board. In this folded position the trapping panel secures the LED array circuit board in position, and the LEDs of the LED array circuit board project through apertures in the trapping panel. Once the LED array circuit board is secured, the lens/reflector is mounted on the housing using one of a number of various means of attachment known in the art. Some embodiments may utilize mounting tabs and mounting clips which frictionally interfere with the housing to attach the lens/reflector. Finally, a cover is attached over the top of the assembly.

In various embodiments of the present invention, the housing may be comprised of a single molded piece of polypropylene. Additionally, the trapping panel may comprise various means for retaining the living hinge in the folded position including the use of panel locking clips which frictionally interfere with the base. The present invention may also utilize a lens/reflector comprising a reflective hood and a substantially translucent lens portion. Like the housing, the components of the lens/reflector may be molded as a single piece. The reflective hood may be coated with a reflective material to improve its reflectivity. Current safety regulations require the light exiting the CHMSL to be red in color. The present invention may utilize red LEDs or a red lens portion in the lens/reflector to comply with these regulations. These and other features, aspects, and advantages of the present invention will become better understood with reference to the following drawings, detailed description and claims.

DETAILED DESCRIPTION OF THE INVENTION

The present invention generally comprises a CHMSL assembly that includes a trapped LED array circuit board within a housing containing a living hinge.

Figure 1:
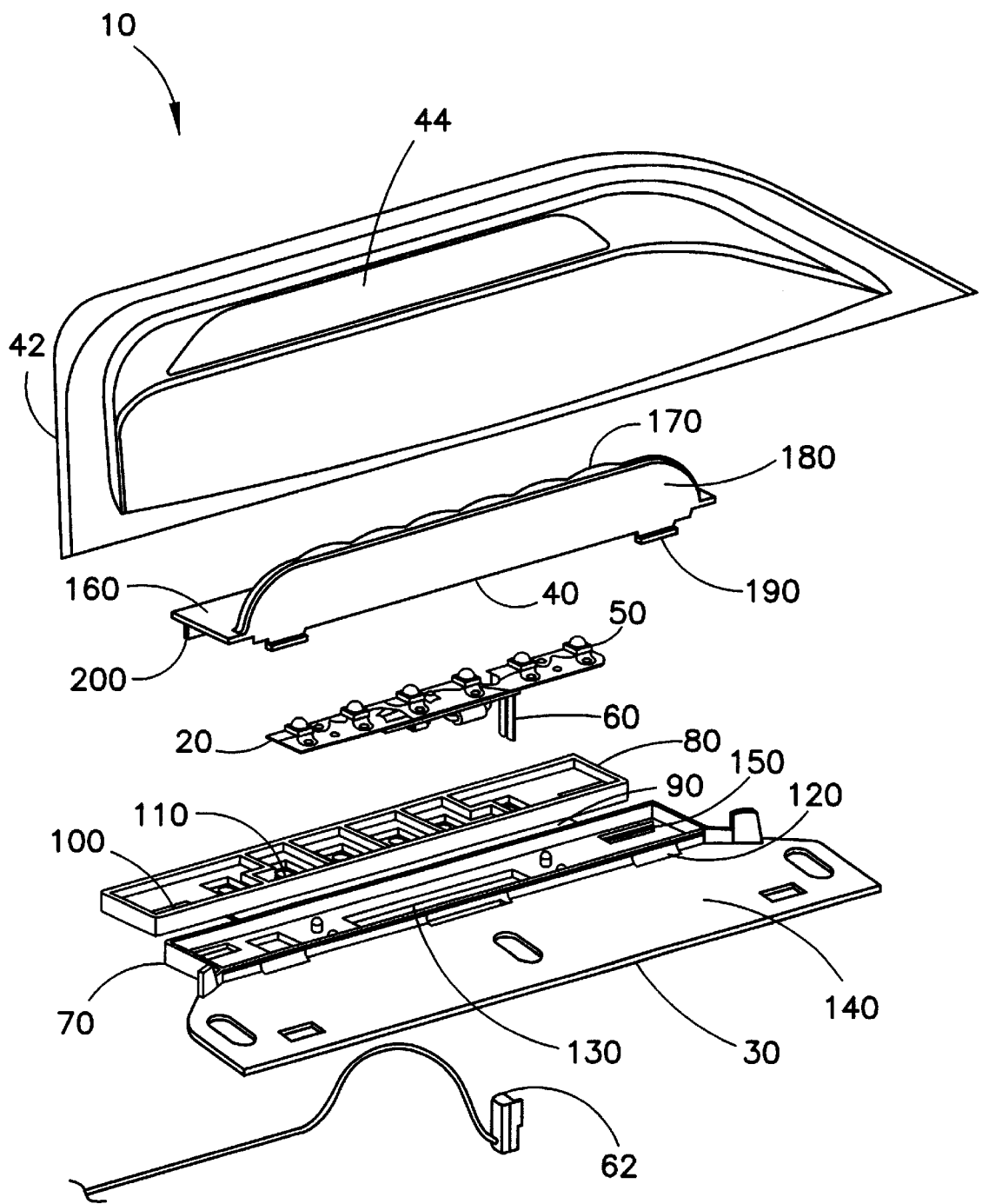
FIG. 1 is an exploded perspective view of a LED CHMSL assembly in accordance with the present invention.

Referring specifically to FIG. 1, there is shown an exploded perspective view of a CHMSL assembly 10 of the present invention. CHMSL assembly 10 comprises a LED array circuit board 20, a housing 30, a lens/reflector 40, and a cover 42. LED array circuit board 20 comprises a typical circuit board which, for example, may be designed with conductive circuitry, usually copper, and electronic components deposited on a supporting substrate and which may be produced by methods commonly known to those skilled in the art. LED array circuit board 20 also comprises a plurality of LEDs 50 arranged in a linear fashion on the top surface of the supporting substrate and electrically connected to conductive contact points deposited in the supporting substrate of circuit board 20. This electrical connection is made by soldering or otherwise bonding each LED 50 to LED array circuit board 20 by methods known to those skilled in the art. LEDs 50 of the present invention may be either colorless crystal LEDs or red LEDs. It will be appreciated by those skilled in the art that other colors of LEDs 50 could also be used in the present invention. While six LEDs 50 are shown in FIG. 1, the number of LEDs 50 may vary from at least one LED 50 to any number of a plurality of LEDs 50 to attain the desired brightness and photometrics. LED array circuit board 20 also comprises an electrical connector 60. Electrical connector 60 provides means for electrically connecting LED array circuit board 20 to vehicle power supplier 62 in order to supply power to LEDs 50.

Housing 30 is molded from a material that is sufficiently rigid to house LED array circuit board 20, but also flexible and bendable at certain thicknesses. Several different materials with these properties are known and may be used, such as, for example, polypropylene. Housing 30 comprises base 70, trapping panel 80, and living hinge 90 which may be integrally formed as a single molded part. Trapping panel 80 is connected to base 70 by living hinge 90 which is thin enough to allow itself to flex and bend to allow trapping panel 80 and base 70 to contact each other when living hinge 90 is folded. Trapping panel 80 and base 70 are molded to be thicker and more rigid than living hinge 90.

Trapping panel 80 comprises at least one locking aperture 100, with two such locking apertures 100 shown in the exemplary embodiment of FIG. 1. Trapping panel 80 further comprises one or more LED apertures 110 as shown in FIG. 1. The number of LED apertures 110 may vary to accommodate a LED 50 of LED array circuit board 20 in each LED aperture 110. In this case, LED apertures 110 also are substantially the same size and shape as LEDs 50 to allow the insertion a of LEDs 50 into LED apertures 110. Alternatively, the configuration of LED apertures 110 may be such that each LED aperture 110 accommodates multiple LEDs 50.

As depicted in FIG. 1, base 70 is molded with recessed chamber 130 to accommodate electrical circuitry projecting from the bottom side of LED array circuit board 20. Recessed chamber 130 also contains a small access portal (not shown) which allows electrical connector 60 to exit housing 30 and to be connected to vehicle power supplier 62. Base 70 is mounted on a support surface (not shown) of the vehicle at the rear of the passenger compartment and adjacent to the rear window of the vehicle with flat plate 140 extending from housing. Base 70 may be mounted to the support surface by any conventional means including the use of adhesives, conventional screws, or any threaded, friction, or interference type fastener. Housing 30 also contains retaining slots 150 near each end of base 70. These retaining slots 150 are aligned with locking apertures 100 and adapted to accept mounting tabs 200 from lens/reflector 40, as further described below. Housing 30 further comprises mounting grooves 120 which are adapted to accept mounting clips 190 from lens/reflector 40, as further described below.

Lens/reflector 40 comprises flat portion 160 which rests on trapping panel 80 when assembly is completed as described below. Lens/reflector 40 further comprises reflective hood 170 and lens portion 180 which is substantially translucent. Reflective hood 170 is fixably secured to lens portion 180 in any one of a variety of manners well known to those skilled in the art. Alternatively, reflective hood 170 and lens portion 180 may be integrally formed as a single molded piece. When integrally formed, lens/reflector 40 comprises a single molded piece of plastic or other suitable material. Along with lens portion 180, reflective hood 170 forms a chamber around LEDs 50. Reflective hood 170 prevents light from LEDs 50 from exiting CHMSL assembly 10 from any direction except through lens portion 180 and serves to reflect light towards lens portion 180. The interior surface of reflective hood 170 may be coated with any of a number of reflective materials known in the art to increase the amount of light reflected back out through lens portion 180.

When lens/reflector 40 is mounted on housing 30, lens portion 180 faces the rear of the vehicle so that light exiting CHMSL assembly 10 is visible to other vehicles traveling behind the vehicle. For the purposes of the present invention, lens portion 180 may be either crystal or red in color. However, it should be noted that the light exiting CHMSL assembly 10 must be red in color to meet current safety requirements. Therefore, for example, if crystal LEDs 50 are used, then lens portion 180 must be red in color. Lens/reflector 40 further comprises mounting clips 190 and mounting tabs 200 to allow for its attachment to housing 30. Mounting tabs 200 are positioned longitudinally at each end of lens/reflector 40 such that they align with retaining slots 150 and locking apertures 100 (when trapping panel 80 is positioned as described below) in housing 30. Mounting clips 190 are positioned on the edge of lens/reflector 40 below lens portion 180, such that mounting clips 190 align with mounting grooves 120. Any other suitable mechanical or frictional retaining means known in the art may be used to attach lens/reflector 40 to housing 30.

In assembly, LED array circuit board 20 is placed in the approximate center of base 70 such that electrical connector 60 and any electrical circuitry projecting from the bottom side of LED array circuit board 20 is seated into recessed chamber 130. This accommodation by recessed chamber 130 allows LED array circuit board 20 to lay flat within base 70. Trapping panel 80 is then folded, at living hinge 90, over LED array circuit board 20 such that LEDs 50 project through LED apertures 110. Trapping panel 80 shields all portions of LED array circuit board 20 from view except for LEDs 50. This improves the aesthetic appearance of CHMSL assembly 10 by covering the electrical circuitry and is desirable to automobile manufacturers and consumers.

Figure 2:
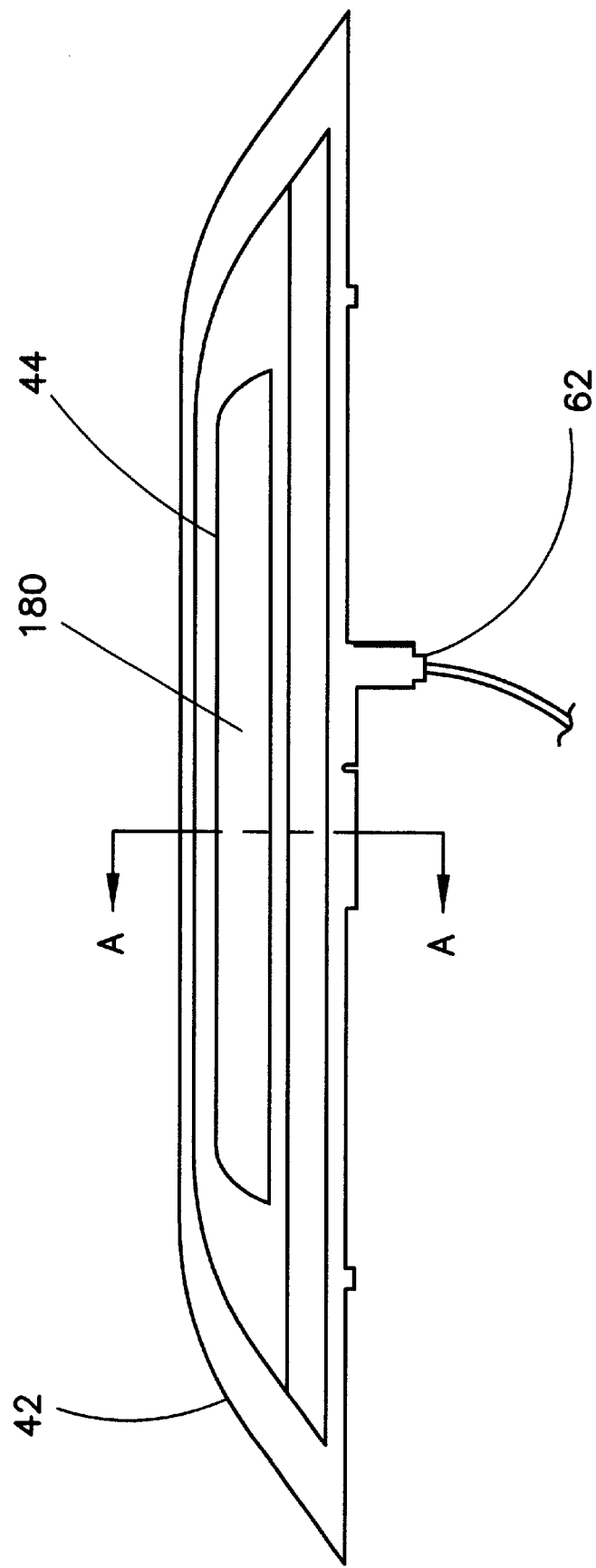
FIG. 2 is a front view of the LED CHMSL assembly of FIG. 1.
Figure 3:
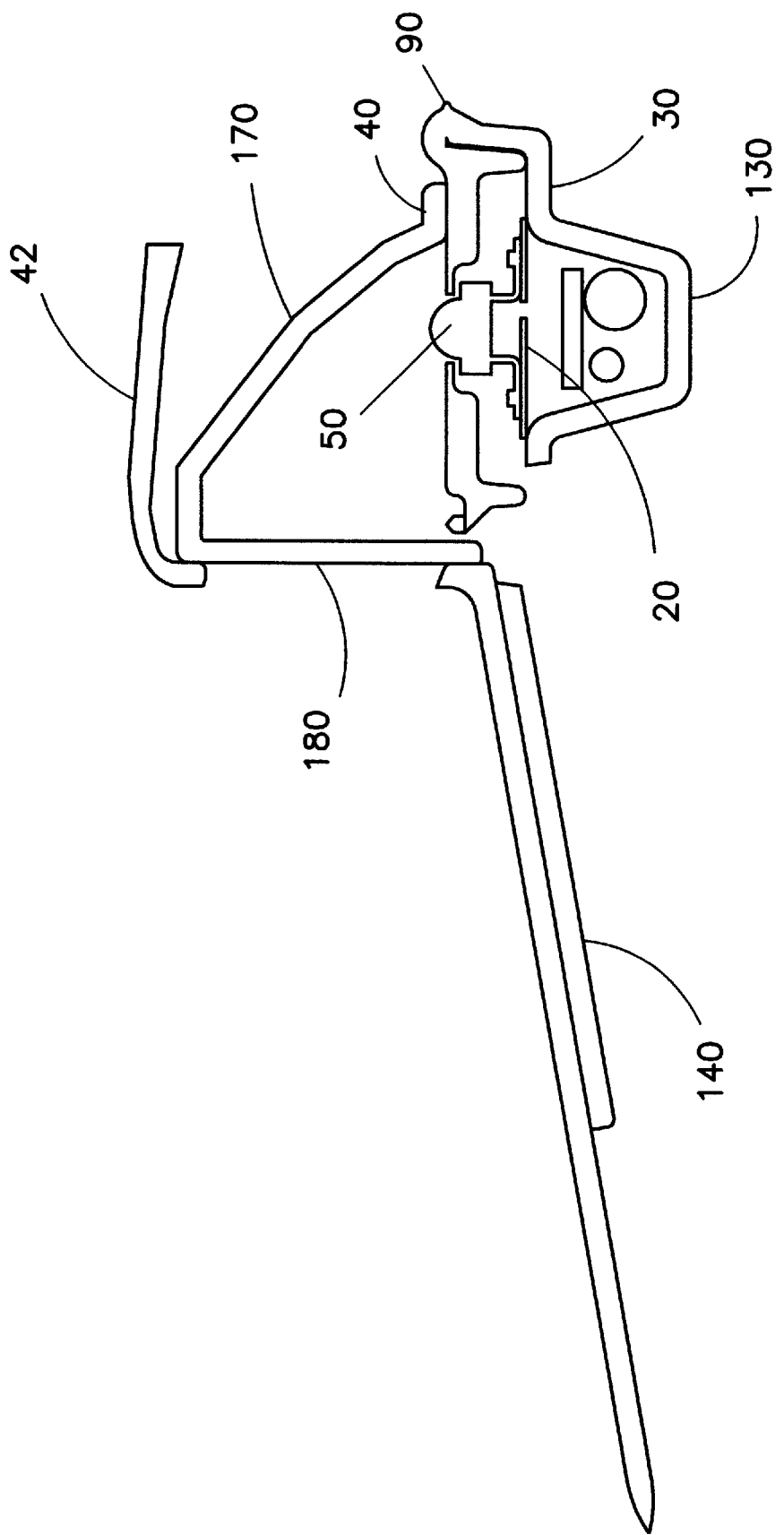
FIG. 3 is a side cross-sectional view of the LED CHMSL assembly of FIG. 2.

Lens/reflector 40 is then positioned over housing 30 with lens portion 180 of lens/reflector 40 facing the rear of the vehicle. In an exemplary embodiment, mounting tabs 200 are then aligned with locking apertures 100 and retaining slots 150. As mounting tabs 200 are lowered through locking apertures 100 and locked into retaining slots 150, mounting clips 190 frictionally engage mounting groove 120 securely locking lens/reflector 40 into place over housing 30. Finally, cover 42, is positioned on top of the assembly and secured to housing 30 and lens/reflector 40 in any one of a variety of manners known in the art, for example, by the use of locking clips, adhesives or screws. It should be noted that cover 42 is secured in such a manner that allows cover 42 to be removable from housing 30 and lens/reflector 40, in the the event that maintenance becomes necessary. Cover 42 is positioned such that opening 44 is in front of lens portion 180, allowing light emitted from LEDs 50 to shine through cover 42. Once assembled, CHMSL assembly 10 may be secured in place in the vehicle and electrical connector 60 may be suitably connected to vehicle power supplier 62. FIG. 2 shows a front elevation view of CHMSL assembly 10 fully assembled (vehicle not shown). FIG. 3 shows a cross-sectional view of CHMSL assembly 10 of the present invention taken along line A—A of FIG. 2.

The exemplary embodiment of CHMSL assembly 10 of the present invention may be assembled manually, without the need of any additional mechanical means or welding processes. This lowers the costs of assembly and manufacture. Even embodiments of the present invention which use other suitable retaining means that may require some tool use for locking trapping panel 80 into position and for securing lens/reflector 40 in position lower the costs of assembly and manufacture because LED array circuit board 20 is physically held in place by trapping panel 80. All embodiments of the current invention eliminate the need for sonic welding or additional fasteners to hold LED array circuit board 20 in place. Additionally, as noted above, the present invention provides CHMSL assembly 10 with LEDs 50 and trapping panel 80 which effectively conceal the electrical circuitry of LED array circuit board 20 improving the appearance of CHMSL assembly 10. Thus, the present invention provides CHMSL assembly 10 which effectively holds LED array circuit board 10 in the correct position, which contains fewer parts, is less complex and less-expensive to manufacture, is easier to assemble, and is more aesthetically desirable than other CHMSL assemblies known in the art.

Although the present invention has been described in considerable detail with reference to a certain exemplary version thereof, other versions are possible, such as embodiments utilizing different attaching or retaining means. Therefore, the spirit and scope of the appended claims should not be limited to the description of the exemplary versions contained herein, and the claims should be given the broadest possible interpretation to protect the novel features of the present invention.

What is claimed is:

1. An automotive center high mount stop lamp for mounting on a vehicle, wherein the vehicle has an electrical system, comprising:
    a housing comprising a base having at least one edge and a trapping panel having at least one edge, said trapping panel foldably joined to said base by a living hinge positioned along said edges of said base and said panel;
    a LED circuit board comprising at least one LED electrically connected to said LED circuit board and an electrical connector connected between the electrical system and said LED circuit board to supply power from the electrical system of the vehicle to said at least one LED, said LED circuit board positioned adjacent to said base;
    said trapping panel also comprising at least one aperture there through cooperatively sized and positioned to allow said trapping panel to be folded along said living hinge over said base and said circuit board to secure said LED circuit board between said base and said trapping panel such that said at least one LED projects through said at least one aperture in said trapping panel; and
    a lens/reflector having attaching means for attaching said lens/reflector to said housing over said at least one LED projecting through said at least one aperture in said trapping panel.

2. The automotive center high mount stop lamp of claim 1 wherein said housing is integrally formed as a single molded piece.

3. The automotive center high mount stop lamp of claim 2 wherein said housing is molded of polypropylene.

4. The automotive center high mount stop lamp of claim 1 further comprising a cover having cover securing means for securing said cover to said housing and said lens/reflector.

5. The automotive center high mount stop lamp of claim 1 wherein said trapping panel further comprises at least one aperture cooperatively sized and positioned to accept said attaching means of said lens/reflector.

6. The automotive center high mount stop lamp of claim 1 wherein said lens/reflector further comprises a reflective hood and a substantially translucent lens portion.

7. The automotive center high mount stop lamp of claim 6 wherein said reflective hood and said lens portion are integrally formed as a single molded piece.

8. The automotive center high mount stop lamp of claim 6 wherein said reflective hood has an interior surface coated with a reflective material.

9. The automotive center high mount stop lamp of claim 6 wherein said lens portion is red in color.

10. The automotive center high mount stop lamp of claim 1 wherein said at least one LED is red in color.

11. The automotive center high mount stop lamp of claim 1 wherein said attaching means comprises at least one mounting tab and at least one mounting clip which frictionally retain said lens/reflector to said housing.

12. An automotive center high mount stop lamp for mounting on a vehicle, wherein the vehicle has an electrical system, comprising:
    a substantially flat base having an upper surface and a trapping panel connected to said base by a living hinge, said living hinge being foldable to permit said trapping panel to fold over said base;
    a LED circuit board comprising a plurality of LEDs electrically connected to said LED circuit board;
    an electrical connector connected between said LED circuit board and the electrical system so that power from the electrical system of the vehicle is conveyed to said LEDs, said LED circuit board positioned adjacent to said upper surface of said base;
    said trapping panel having a plurality of apertures there through corresponding in number to said plurality of LEDs and cooperatively sized to allow said trapping panel to be folded along said living hinge over said base to secure said LED circuit board between said base and said trapping panel such that one LED projects through each said aperture;
    retention means for retaining said trapping panel in a folded position over said base;
    a lens/reflector positioned over said plurality of LEDs projecting through said apertures;
    attaching means for attaching said lens/reflector to said housing; and
    a cover removably attached to said base and said lens/reflector.

13. The automotive center high mount stop lamp of claim 12 wherein said base and said trapping panel are integrally formed along said living hinge as a single molded piece.

14. The automotive center high mount stop lamp of claim 13 wherein said single molded piece is molded of polypropylene.

15. The automotive center high mount stop lamp of claim 12 wherein said retention means comprises at least one aperture on said trapping panel, at least one aperture on said base and at least one mounting groove in said base which engage said lens/reflector.

16. The automotive center high mount stop lamp of claim 12 wherein said lens/reflector further comprises a reflective hood and a substantially translucent lens portion.

17. The automotive center high mount stop lamp of claim 16 wherein said reflective hood and said lens portion are integrally formed as a single molded piece.

18. The automotive center high mount stop lamp of claim 16 wherein said reflective hood has an interior surface coated with a reflective material.

19. The automotive center high mount stop lamp of claim 16 wherein said lens portion is red in color.

20. The automotive center high mount stop lamp of claim 12 wherein said plurality of LEDs are red in color.

21. The automotive center high mount stop lamp of claim 12 wherein said attaching means comprises at least one mounting tab and at least one mounting clip which frictionally retain said lens/reflector to said folded base and said trapping panel.

22. An automotive stop lamp assembly for mounting on a vehicle having an electrical system for supplying electrical power to electrical components of the vehicle, said assembly comprising:

a base member having a recessed portion formed therein;

a circuit board having an electrical circuit formed thereon, said circuit board positioned within said recessed portion, and said circuit board having at least one LED electrically connected to said circuit;

a panel member connected to said base member by a foldable connection so that said panel member can be folded over said base member and said recess, said panel member having at least one aperture formed there through, and said at least one aperture being dimensioned and positioned so that said at least one LED extends through said at least one aperture when said panel member is folded along said foldable connection over said base member;

a lens/reflector member adapted to be positioned over said at least one LED extending through said at least one aperture;

a retainer retaining said lens/reflector over said at least one LED;

an electrical connector connecting the electrical system to said circuit to supply electrical power to said at least one LED so that said LED emits light; and a cover member adapted to be positioned over said lens/reflector member.

23. The assembly of claim 22 wherein said lens/reflector member comprises a reflective portion and a translucent lens portion, said reflective portion arranged to reflect light emitted by said at least one LED through said lens portion.

24. The assembly of claim 22 wherein said base member has an access opening communicating with said recessed portion, and said electrical connector is positioned to pass through said access opening to access said circuit.

25. The assembly of claim 22 wherein said panel member and said base member are molded as a single unit, and said foldable connection is a molded living hinge.

26. The assembly of claim 22 wherein means are provided to retain said panel member in a folded position over said base member.

27. The assembly of claim 22 wherein said base member is adapted to be mounted to the vehicle.

28. The assembly of claim 22 wherein said panel member is dimensioned to fit into said recessed portion when said panel member is folded over said base portion.

* * * * *